United States Patent [19]
Capehart et al.

[11] 4,138,592
[45] Feb. 6, 1979

[54] ELECTROMAGNETIC DETECTION LINE DIGITIZER

[76] Inventors: Jack D. Capehart, 5562 Overbrooke Rd., Kettering, Ohio 45440; John F. Mazzae, 803 Picket Pl., Dayton, Ohio 45433; David R. McGrew, 7543 Abraham Ct., Dayton, Ohio 45414

[21] Appl. No.: 833,778

[22] Filed: Sep. 16, 1977

[51] Int. Cl.² .............................................. G08B 5/22
[52] U.S. Cl. .................................. 178/19; 346/139 C
[58] Field of Search ........................... 178/19, 18, 20; 318/568; 35/61; 200/159 B; 340/146.3 SY; 346/139 C; 33/1 M, 1 LE

[56] References Cited
U.S. PATENT DOCUMENTS

| | | | |
|---|---|---|---|
| 3,894,183 | 7/1975 | Barish | 178/18 |
| 3,936,712 | 2/1976 | Gerber et al. | 318/568 |
| 3,982,165 | 9/1976 | Rich | 178/18 |

Primary Examiner—Thomas A. Robinson
Attorney, Agent, or Firm—Joseph E. Rusz; Robert Kern Duncan

[57] ABSTRACT

A graphic curve digitizer is disclosed wherein the x-y coordinate values of a response curve (made electrically conductive) are obtained by a digitally controlled x-y conductive probe and electronic system sensing when the probe contacts the curve by the voltage signal existing in the conductive curve due to the antenna effect of the conductive curve in an environmental alternating current electromagnetic field.

2 Claims, 3 Drawing Figures

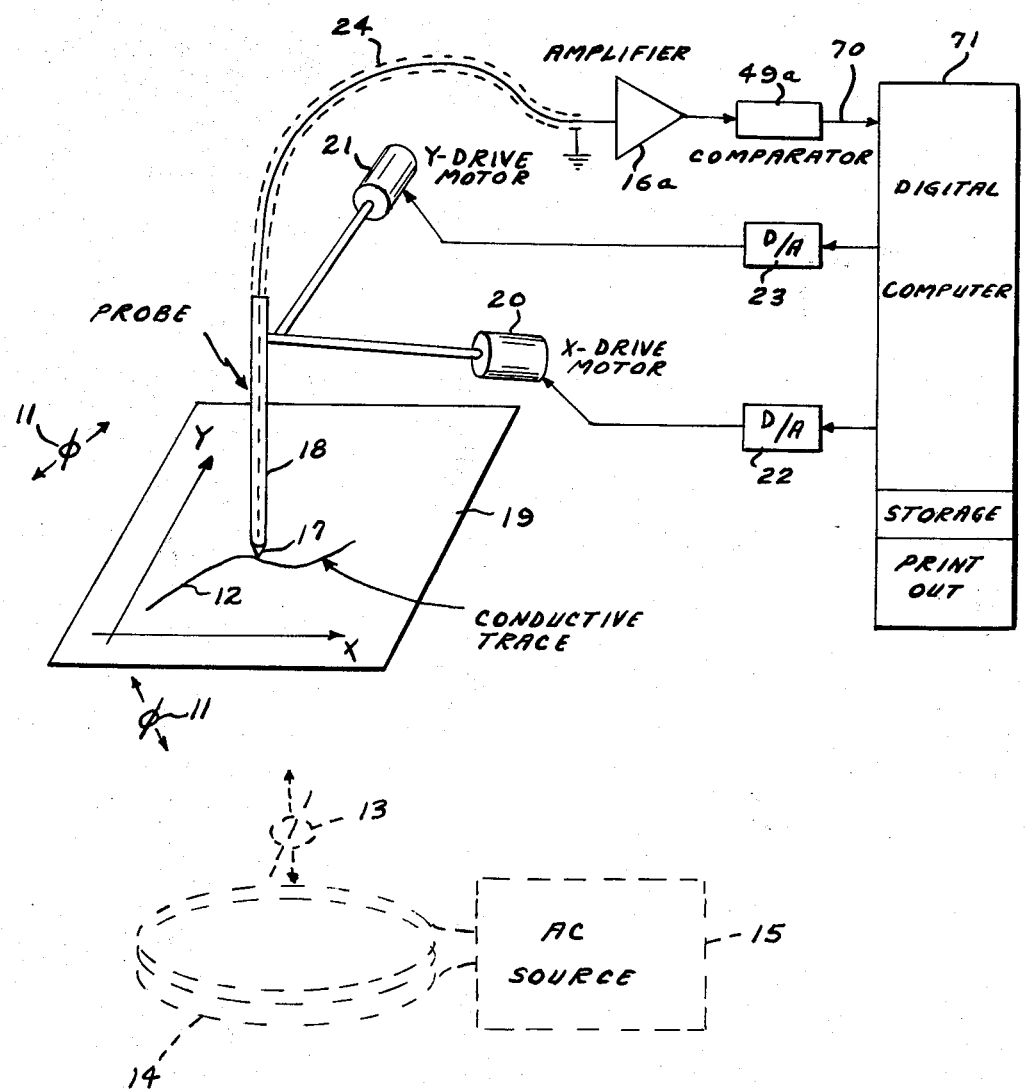

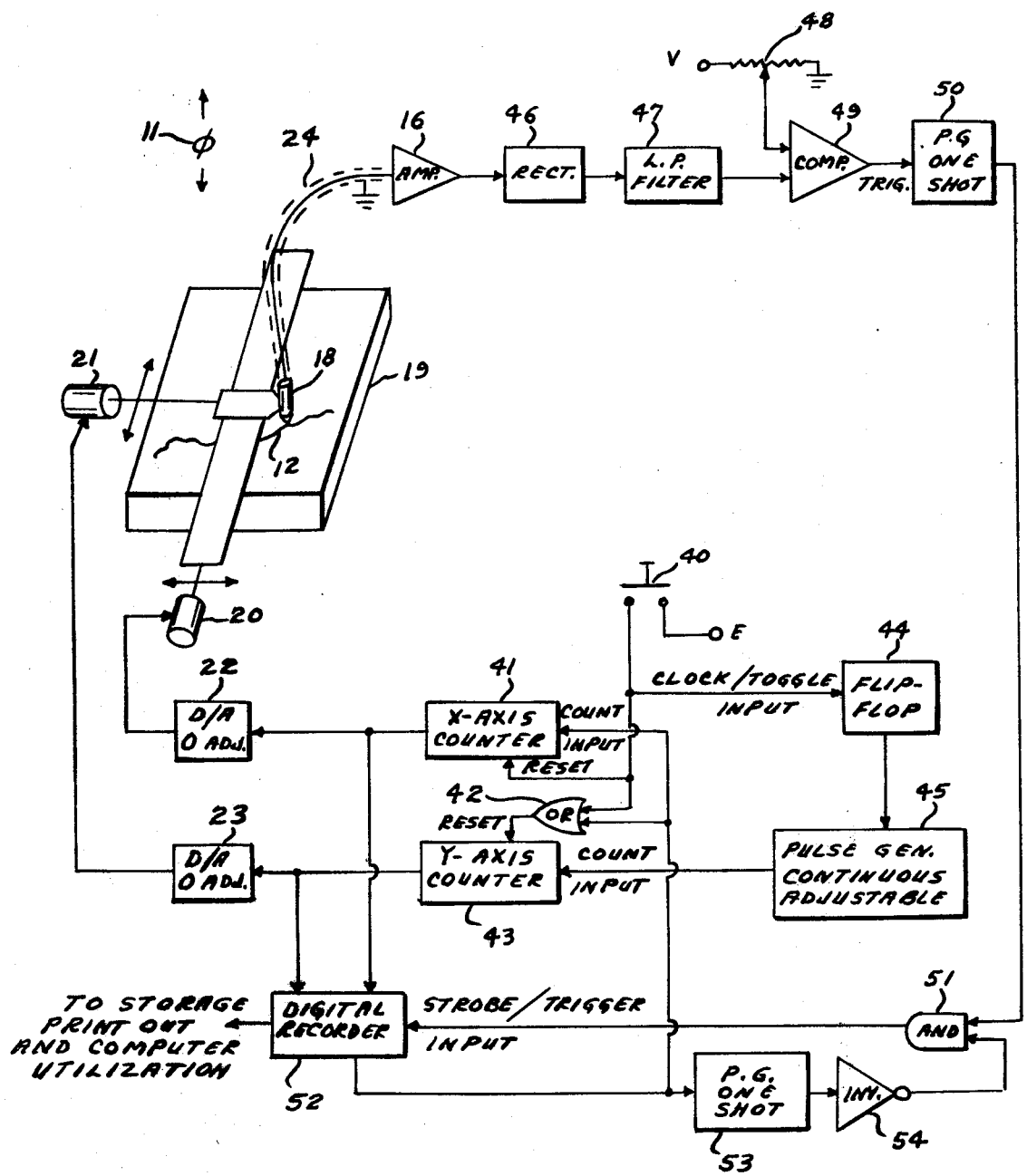

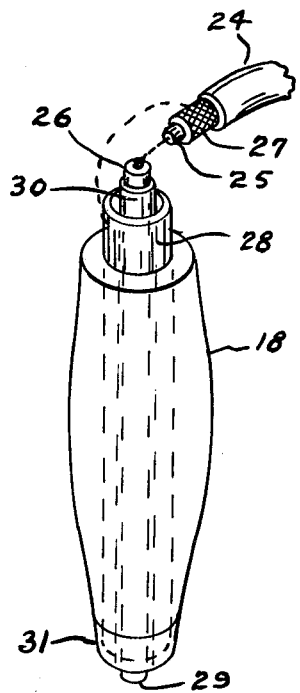

ELECTROMAGNETIC DETECTION LINE DIGITIZER

RIGHTS OF THE GOVERNMENT

The invention described herein may be manufactured and used by or for the Government of the United States for all governmental purposes without the payment of any royalty.

BACKGROUND OF THE INVENTION

The field of the invention is in the data collection art and more particularly the art of automatically expressing a graphic curve in digital x-y coordinate form.

Many times, it is desirable to digitize y versus x data from plotted curves. Manually, it is a most tedious task with the probability of human errors occurring in reading data points from the plotted curves being great. Examples of the prior art devices to remove the human element from the conversion process are disclosed by the following U.S. patents; No. 3,803,588 to patentee LeSchack; No. 3,848,089 to patentee Stewart; No. 3,982,165 to patentee Rich; and No. 4,018,989 to patentees Snyder et al.

SUMMARY OF THE INVENTION

The disclosed apparatus provides a system for automatically and rapidly digitizing in coordinate form the characteristics of a plotted curve. For example, graphical x-y data, such as aircraft aerodynamic curves, can be taken from a curve trace and entered directly into a computer for further utilization.

BRIEF DESCRIPTION OF THE DRAWING

FIG. 1 is a simplified schematic-pictorial representation of an embodiment of the invention;

FIG. 2 is a detailed block-schematic diagram of an embodiment of the invention; and FIG. 3 is a pictorial representation of a probe suitable for sensing the location of a curve in a conventional x-y plotter.

DESCRIPTION OF THE PREFERRED EMBODIMENT

The invention as disclosed herein will generally be used in a building where AC power is available and in almost any building where AC power is available, an amplifier with a high enough input impedance, typically greater than 1 megohm, can detect the presence of normal ambient electromagnetic AC radiation which is being radiated by the AC power wiring in the building. Any small piece of unshielded conductor connected to the amplifier input is normally sufficient to act as an antenna, and the strength of the signal received is a function of the surface area of the conductor so used. Thus, when a probe, having a relatively small unshielded sensing area, is connected to a high impedance amplifier, the signal output from the amplifier will be increased many times when the probe is in contact with an additional conductor such as a pencil line even when it is only a fraction of an inch long. In rare instances, where the equipment of the invention is battery operated in a remote area, it may be necessary to supply or augment the ambient AC field. Referring to FIG. 1, the normal random AC ambient field 11 will generally be sufficiently strong to induce a suitable "noise" potential in conductive trace 12. In the rare instance just mentioned where substantially no ambient field exists, a suitable electromagnetic AC field 13 may be generated by a relatively large coil 14 and AC energy source 15. A few watts of power at conventional power line frequencies of 50 hertz to 400 hertz is suitable. The AC source 15 may conveniently be an audio oscillator. For embodiments of the type being described, amplifier-rectifier system 16a utilizes a conventional high impedance (over one megohm) input audio amplifier. In some instances in remote areas where no power line generated AC field exists it may be more desirable to use a broad band amplifier that encompasses a portion of the radio frequency spectrum and utilize the existing ambient radio frequency noise energy, rather than generate a "power line" frequency field. The conductive trace 12 then functions as an RF antenna to the amplifier when the conductive tip 17 of probe 18 contacts the trace and the "hiss" level output from the amplifier greatly increases. The system of the invention functions equally well whether utilizing the increase in "hum" level from local power lines when the probe tip contacts the curve or the increase in radio frequency "hiss" level from existing radio frequency fields.

The invention as illustrated in FIGS. 1 and 2 includes many well known elements. It is to be noted that in the simplified drawing of FIG. 1 that block 16a comprises in addition to the high impedance amplifier, the rectifier and filter, and that block 49a comprises in addition to the comparator, the reference voltage, and the one-shot pulse generator. The plotting table, or board, and the x and y drive motors 20 and 21 and associated mechanisms are conventional elements of typical curve plotting devices. The drive motors 20 and 21 in typical conventional curve plotter are conventional position servo motors. However, curve plotters with stepper motors may be used. With stepper motor type curve plotters, the digital to analog convertors 22 and 23 are replaced with conventional digital stepper motor drive circuits.

An object of the invention is to convert graphical data, i.e., plotted curves, into electrical signals primarily for input directly to a digital computer. As illustrated in FIGS. 1 and 2 the graphical curve 12 is a curve of data previously obtained. Generally, it is a curve drawn in ink on paper. It may be a curve previously made by an x-y curve plotter that is now modified by a stylus change for this invention. To utilize the previously made curve trace 12, in this invention, it must be, or made to be, electrically conductive and it must be on an insulative background such as paper, fiber board, cardboard, or similar material. This is easily done by going over the trace with a conventional graphite pencil. The conductive curve trace is placed on the plotting board 19 of a conventional x-y plotter. The conventional inking pen carried by the x-y transport mechanism is replaced with a shielded electrically conductive sensing probe 18. The probe is connected to a high input impedance amplifier 16 by a shielded conductor, typically conventional coaxial cable 24. A suitable probe is detailed in FIG. 3. To better illustrate structural details, in FIG. 3 the shielded cable 24 is shown detached from probe body 18. It is to be understood that the shielded center conductor 25 is directly connected (e.g., soldered) to probe conductive center conductor 26, and that shield 27 of cable 24 is spread over and insulated from the center conductor and connected to probe shield 28 in a manner well known in the shielded conductor and coaxial cable art. It is necessary that the input conductor to the amplifier be shielded all the way from probe tip 29 into the amplifier. Thus, only the very small area of tip 29 of the probe is sensitive to electromagnetic field pickup. The materials used in constructing the probe are not critical. Metal center conductor 26 may be copper, steel, silver, or other suitable conductive material. Generally, rounded tip 29 is formed on the end of conductor 26. However, for long life and good wear properties, it may be fabricated from a harder metal than the center conductor and then soldered or welded to the center conductor. (In an early embodiment of the invention, the center conductor and tip were formed from a section of an ordinary paper clip.) Insulating sleeve 30, surrounding the center conductor and insulating it from probe shield 28, may be any good conventional electrical insulating sleeving. Teflon is a suitable material. Metal tube 28, electrically contiguous with conductor shielding 27, extends the shielding of the center conductor to probe tip 29. Copper or steel is a suitable material for shield 28. (In the early embodiment previously mentioned, shield 28 was fabricated from a large bore hypodermic needle.)

Body 18 of the probe supports the electrical components of the probe and mechanically adapts the probe to fit in place of the plotting pen cartridge in the x-y plotter. A plastic tube, into which shield 28 of the probe is pressed, with the outside of the plastic tube shaped for insertion into the pen support, forms a suitable body. (A discarded pen case may suitably be used.) Epoxy cement may be used to further secure center conductor 26, insulating sleeve 30, shield 28, and body 18 into a unitary assembly. It is also generally desirable to cover and fill the end of the probe with epoxy 31, except for the tip of center conductor 29. This holds the center conductor firmly in position with respect to the probe body and eliminates position errors that would be caused by any movement of the center conductor with respect to the probe body, which is firmly held by the x-y transport mechanism of the plotter.

The operation of the invention may best be understood by referring to FIG. 2. Pushbutton 40 is both a start and a reset switch. When pushed, it resets X-axis counter 41 and, through OR gate 42, resets Y-axis counter 43. It also changes the state (true-to-false or false-to-true) of flip-flop 44, whose output either starts or stops pulse generator 45. (Generator runs when input is true.) When pulse generator 45 is stopped, the zero adjustments in digital to analog converters 22 and 23 are adjusted so probe 18 is over a reference point, typically x=0, y=0, on the same sheet of paper as the curve to be digitized. When pushbutton 40 is pushed again, pulse generator 45 will start running and Y-axis counter 43 will start counting up. (Resolution of curve detection is a function of count lengths.) The count output from Y-axis counter will begin moving probe 18 up toward the graphite coated (penciled over) curve on plotting board 19. When probe 18 makes electrical contact with the curve, the voltage between the probe tip and signal ground increases since the curve is acting as an antenna in the ambient field in the vicinity of plotting board 19. This difference in voltage is amplified by high gain amplifier 16 and converted to smooth DC by absolute value rectification circuit 46 and low pass filter 47. The DC level is compared, in comparator amplifier 49, to a reference voltage, from the setting of potentiometer 48. Typically, this reference voltage that is set into the comparator is slightly greater than the voltage output from the filter due to the normal noise level in the system when the probe is not contacting any conductive curve. Then, when the probe contacts a conductive curve the output from filter 47 exceeds this reference voltage level and the comparator puts out a signal which triggers the one shot pulse generator 50. Pulse generator 50 then puts out a single pulse. This pulse (through AND gate 51) causes recorder 52 to commence its recording cycle. Upon completion of the recording cycle, recorder 52 outputs a single pulse which increments X-axis counter 41 and resets Y-axis counter 43 through OR gate 42.

The same pulse output by recorder 52 (when X and Y values are both recorded) is extended by pulse generator 53, inverted by logic inverter 54, and used in AND gate 51 to inhibit a double recording of the same point when probe 18 recrosses the curve at the time the Y-axis counter resets. The pulse width of adjustable pulse generator 53 must be set wide enough to inhibit pulse from generator 50 on probe return from triggering recorder 52.

It is to be observed that in addition to practicing the invention by fabricating the apparatus shown in FIG. 2, it may be practiced by the proper programming of a conventional digital computer. Generally, conventional, modern digital computers have as a peripheral device a mechanical plotter (either digitally controlled or analog), and at least one discrete input which may be polled or will cause an interrupt in the digital computer. Using a conventional computer having these capabilities, it is only necessary to fabricate the probe as illustrated in FIG. 3, insert it in place of the inking pen in the X-Y plotter, and connect to the probe a conventional high impedance input amplifier and a comparator having an adjustable reference level. This is schematically illustrated in FIG. 1. Probe 18 has replaced the inking pen stylus. The probe is connected to high input impedance amplifier 16a by shielded cable 24. A reference level, as previously described, is set in comparator 49a, and when a representative signal from the probe exceeds this reference level, an interrupt signal appears on line 70 to digital computer 71. The computer is programmed to move the probe in such a way that when it contacts the line which represents the data on the graph, the graphite curve acting as an antenna, an increase in the electromagnetic radiation is received from the probe. The comparator 49 generates an output signal when the signal from the amplifier exceeds the adjustable threshold set in the comparator, i.e., when it contacts the curve, and provides a signal to the computer discrete input which enables the computer to detect the fact that the probe is in contact with the graphite trace. The computer is programmed to successively increment the probe position along one axis and search for the line in the other axis. The computer thus obtains data points from the graphical data and either stores them for later use or outputs them in the form desired, i.e., punched cards, paper tape listings, optical display, or other, within the capabilities of the particular computer employed.

To automatically digitize a plot under computer control, a typical program comprising the following steps written into the computer will position the probe during the search for the line.

After the paper containing the plot is placed on the X-Y plotter;

a. Store the minimum and maximum X and Y values expected during the search (normally from the axes for the plot).

b. Store the desired abscissa resolution (the increment in X) and the ordinate resolution (the increment in Y) to be used during the search. The Y axis resolution should be less than 0.1% of the ordinate range to assure the curve is not skipped during the search.

c. The plotter should be calibrated to go between 0.0 volts at the minimum X and Y, to 100.0 volts at the maximum X and Y. A calibration of the probe position should be done at these two points.

d. Start the search at the minimum X and Y point and increment Y until the pencil line is detected. Detection occurs due to an increase in signal strength at the probe (greater than the preset threshold voltage). At that time the comparator output will change and its logic level change, which is being monitored by the digital computer, will result in the position of the probe being stored in the computer as the first data point.

Subsequent points are found by incrementing X one step followed by incrementing Y until the line is found again. Should the probe search in the wrong direction, due to a change in sign of slope of the curve, the search direction can be reversed once the maximum or minimum Y value is reached by having the program note this and change the sign of the increment in Y. Once X maximum is reached the search is complete and a set of X-Y values describing the line has been stored in the computer.

Briefly, the computer program steps would be:
a. Store Xmin, Ymin, Xmax, Ymax, dx, dy and set i=1.
b. Calibrate probe on plotter and set threshold.
c. Set probe to Xmin, Ymin.
d. If probe potential is greater than threshold go to h.
e. If Y equals Ymax, let $dy = -dy$.
f. Let $Y = Y + dy$.
g. Go to d.
h. Store current probe position in X(i), Y(i).
i. Let $i = i+1$.
j. If $X \geq Xmax$, stop.
k. Let $X = X + dx$.
l. Go to d.

We claim:
1. A graphic curve digitizer for converting data from the form of an x-y plotted conductive graphical curve to digital data in x-y coordinate form; the said conductive graphic curve being located in a normal ambient alternating current electromagnetic field and thereby having an induced voltage, the said digitizer comprising:

a. an x-y plotter having a stylus support and x-y transport mechanism for moving the said stylus support and means for receiving the said x-y plotted graphical curve;
b. a shielded electrically conductive stylus having a sensitive tip positioned in said stylus support;
c. a high impedance amplifier electrically connected to the said stylus and providing an output;
d. a comparator having a predetermined reference level electrically connected to said high impedance input amplifier and providing an output when the said output from the high impedance amplifier exceeds the said reference level; and
e. means cooperating with the said output of the comparator and the said stylus transport mechanism for advancing the said transport mechanism in x and y increments responsive to the said stylus contacting the said conductive graphical curve and providing a digitized record of the said curve.

2. A graphic curve digitizer for digitizing a curve trace on an insulative background in digital x-y coordinates comprising:

a. means for making the said graphic curve trace electrically conductive;
b. an ambient alternating current electromagnetic field generating in said conductive curve trace an induced voltage;
c. a shielded electrical conductive stylus having a voltage sensitive tip for sensing the said induced voltage;
d. an x-y plotter having a stylus transport mechanism with means for moving the said stylus in x-y coordinates and means for receiving and positioning the said tip of the said electrically conductive stylus in contact with the said insulative background;
e. a high impedance input amplifier connected to the said stylus and providing an output responsive to the said electromagnetic field induced voltage sensed by the said stylus tip;
f. an electrical comparator having a determined reference voltage and providing an output when the said tip of the conductive stylus is in contact with the said conductive curve; and
g. means cooperating with the output of the said comparator and the said stylus transport mechanism for moving the said stylus responsive to the said graphic curve and providing digital x-y coordinates of the said graphic curve.

* * * * *